June 4, 1946. A. G. ROSA 2,401,509

ELECTRODE CONTACT ASSEMBLY

Filed Oct. 26, 1943

INVENTOR.
ANTHONY G. ROSA.
BY
ATTORNEY.

Patented June 4, 1946

2,401,509

UNITED STATES PATENT OFFICE 2,401,509

ELECTRODE CONTACT ASSEMBLY

Anthony G. Rosa, Lyndhurst, N. J.

Application October 26, 1943, Serial No. 507,682

1 Claim. (Cl. 173—328)

This invention relates to new and useful improvements in the manufacture and application of electrodes, and more particularly it relates to an electrode contact assembly used in connection with electric ray tubes, etc.

Heretofore such electrodes consisted of a screw member and a nut. After such members were assembled, they were, however, rarely found to be in alignment. Thus, it would require extra time and machinery to make the necessary adjustments. It is, however, of the greatest importance that two opposing electrodes in such tubes be in perfect alignment to permit the ray passing from the one electrode to the other electrode in the opposite end of the tube to strike perfectly in the center of the electrode, which otherwise would be seriously damaged by burning the edge when the ray strikes.

At times it is necessary to have two electrodes on a shaft, one on each end thereof. It is of the greatest importance to keep the distances between the contact surfaces, in such cases, accurate to the closest tolerance. With the present method of assembling the contacts at the ends of the shaft, this becomes a very difficult operation.

It is also of great importance to have the straight outside surface of the electrode smooth. With the process of assembly at the present time, this requires an extra operation, while according to my process a press polishing operation takes place at the same time.

It is an object of this invention to provide for electrodes consisting of a post and a cap-like sleeve; the latter to be pressed upon said post, and at the same time providing a perfect alignment of these parts within the base of the tube socket.

It is a further object of this invention to provide for an electrode, which, when once assembled, will be securely gripped and thus preventing the parts from coming loose during vibration.

It is still another object of this invention to provide electrodes to the two ends of a shaft in perfect alignment with each other, by pressing the two electrodes accurately on both ends of the shaft.

It is yet another object of this invention to provide means whereby the distance between the electrode surfaces can be closely controlled during the assembly operation.

It is a further object of this invention to utilize the high pressure required for the assembly of the electrodes, to cause at the same time the electrode surfaces to be made perfectly smooth.

These and other objects will be clearly obvious from the specification and the drawing, in which Figure 1 illustrates a conventional electric ray tube utilizing such electrodes.

Figure 1:
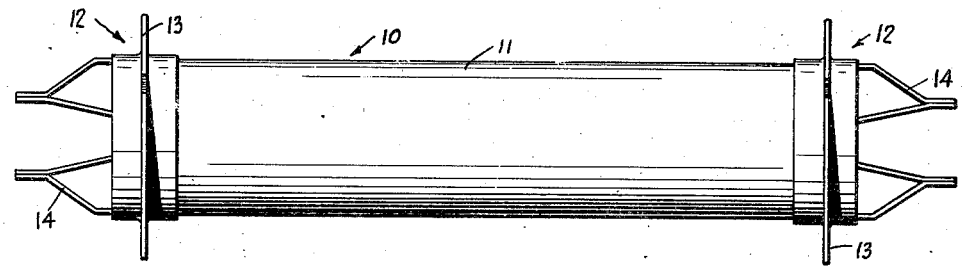
Figure 3:
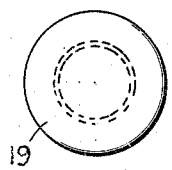
Figure 3 is an enlarged left-hand front view of Figure 2.
Figure 2:
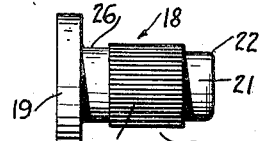
Figure 2 is an enlarged and side elevation of the post in accordance with the invention.
Figure 4:
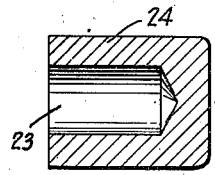
Figure 4 is an enlarged cross-sectional view of the sleeve member.
Figure 5:
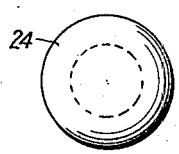
Figure 5 is an enlarged right hand end view of Figure 4.
Figure 6:
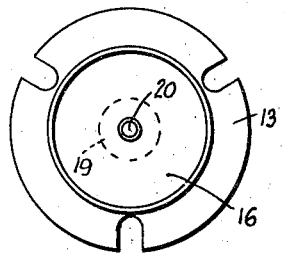
Figure 6 is an inside view of the base with the post in place.
Figure 7:
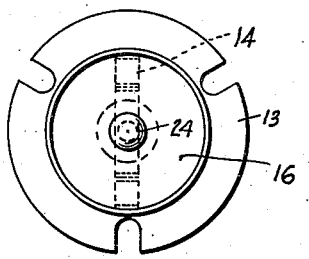
Figure 7 is an inside view of the completely assembled base.
Figure 8:
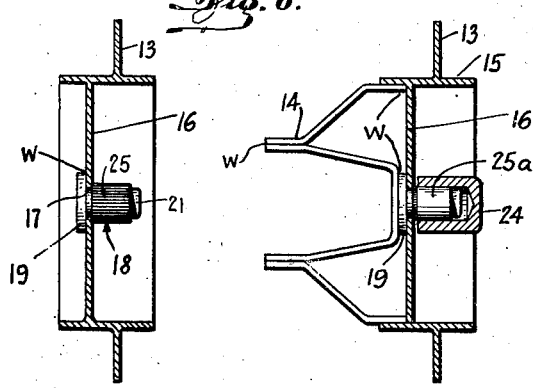
Figure 8 is a cross-sectional view through the base in Figure 6.
Figure 9:
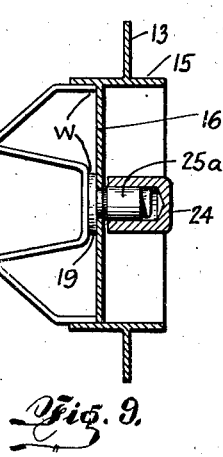
Figure 9 is a cross-sectional view through the completed base in Figure 7.

The electric ray tube 10 in one of its forms consists of the glass tube portion 11 and the two bases or sockets 12, having conventional flanges 13 and contacts 14 for the attachment to an apparatus, such as a radar (not shown).

The base 12, besides the flange 13, is provided with a cylindrical sleeve 15, which at its central portion terminates in a bottom 16. A perforation 17 in the bottom 16 permits the mounting of the post 18, which consists of the head 19 and the shank 20. The shank 20 comprises three parts, namely, the end portion 21, rounded or chamfered, as at 22 for easy insertion into the opening 23 of the sleeve member 24; the central portion 25 of the post 18, which is knurled or otherwise prepared to provide a secure grip within the bore 23; and between the knurled portion 25 and the head 19 is a slightly recessed portion 26, which will tightly fit into the opening 17 in the bottom 16. When the sleeve member 24 is applied to the post 18 under the proper pressure, the knurled portion 25 will be destroyed at the point of contact, as at 25a, thus providing the friction needed to prevent the separation of the sleeve 24 from the post 18. In its final form, the various members of the contact 14 may be welded to the inside of the sleeve 15 and to the head 19, as shown at W. Thus it is accomplished to secure a perfect axial alignment of the post and sleeve assembly during the operation and simultaneously with the pressing of the sleeve 24 upon the shank 20 of the post 18. The depth of the insertion of the shank 20 into the bore 23 of the sleeve 24 will naturally be determined at the same time.

It is obvious that changes may be made in the form, construction, and arrangement of the several parts, as shown within the scope of the appended claim, without departing from the spirit of the invention, and I do not, therefore, wish to limit myself to the exact construction and arrangement shown and described herein.

What I claim as new and desire to secure by Letters Patent of the United States is:

In a device for securing axial alignment between electrodes, a socket having a bottom formed with an opening therein, flanges projecting from both sides of said bottom, a post comprising a head and a shank, the latter having a chamfered end portion, and a knurled center portion; and a sleeve having a central bore adapted for mounting upon said post by means of the chamfered end-portion and knurled center portion, said post having a slight recess between its knurled portion and the head adapted to fit the opening in the bottom of the socket, and contact members secured to the opposite side of the bottom and to the head of said post, substantially as shown and described.

ANTHONY G. ROSA.